(12) United States Patent
Deshpande

(10) Patent No.: US 12,413,751 B2
(45) Date of Patent: Sep. 9, 2025

(54) SYSTEMS AND METHODS FOR SIGNALING NETWORK ABSTRACTION LAYER UNIT INFORMATION IN VIDEO CODING

(71) Applicant: SHARP KABUSHIKI KAISHA, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/538,494

(22) Filed: Dec. 13, 2023

(65) Prior Publication Data

US 2024/0121413 A1 Apr. 11, 2024

Related U.S. Application Data

(63) Continuation of application No. 17/619,900, filed as application No. PCT/JP2020/023288 on Jun. 12, 2020, now Pat. No. 11,902,546.

(60) Provisional application No. 62/870,936, filed on Jul. 5, 2019, provisional application No. 62/863,821, filed on Jun. 19, 2019.

(51) Int. Cl.
*H04N 19/169* (2014.01)
*H04N 19/70* (2014.01)

(52) U.S. Cl.
CPC ........... *H04N 19/188* (2014.11); *H04N 19/70* (2014.11)

(58) Field of Classification Search
CPC ............................. H04N 19/188; H04N 19/70
See application file for complete search history.

(56) References Cited

U.S. PATENT DOCUMENTS

2019/0082184 A1* 3/2019 Hannuksela ........... H04N 13/15
2020/0177923 A1* 6/2020 Chen .................... H04N 19/503

OTHER PUBLICATIONS

Bross et al. ("Versatile Video Coding (Draft 8)", Joint Video Experts Team (JVET) of ITU-T SG 16 WP 3 and ISO/IEC JTC 1/SC 29/WG 11; 17th Meeting: Brussels, BE, Jan. 7-17, 2020; Document: JVET-Q2001-vE) (Year: 2020).*

* cited by examiner

*Primary Examiner* — Maria E Vazquez Colon
(74) *Attorney, Agent, or Firm* — ScienBiziP, P.C.

(57) ABSTRACT

A device may be configured to signal network abstraction layer unit information according to one or more of the techniques described herein.

3 Claims, 6 Drawing Sheets

SYSTEMS AND METHODS FOR SIGNALING NETWORK ABSTRACTION LAYER UNIT INFORMATION IN VIDEO CODING

CROSS REFERENCE

The present application is a continuation application of U.S. patent application Ser. No. 17/619,900, filed on Dec. 16, 2021, which is the National Stage of International Application No. PCT/JP2020/023288, filed on Jun. 12, 2020, which claims priority under 35 U.S.C. § 119 on provisional Application No. 62/863,821 filed on Jun. 19, 2019, and No. 62/870,936 filed on Jul. 5, 2019, the entire contents of which are hereby incorporated by reference.

TECHNICAL FIELD

This disclosure relates to video coding and more particularly to techniques for signaling network abstraction layer unit information for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," 10$^{th}$ Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 5)," 14th Meeting of ISO/IEC JTC1/SC29/WG11 19-27 Mar. 2019, Geneva, CH, document JVET-N1001-v7, which is incorporated by reference herein, and referred to as JVET-N1001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding network abstraction layer unit information, the method comprising: receiving a network abstraction layer unit header syntax structure having two bytes; and decoding a first 1-bit syntax element, a second 1-bit syntax element and a 6-bit syntax element in the network abstraction layer unit header syntax structure, wherein a value of the first 1-bit syntax element is equal to zero, a value of the second 1-bit syntax element is equal to zero, and the 6-bit syntax element specifies an identifier of a layer to which a VCL NAL unit belongs or an identifier of a layer to which a non-VCL NAL unit applies.

In one example, a method of coding network abstraction layer unit information, the method comprising: coding a first 1-bit syntax element, a second 1-bit syntax element and a 6-bit syntax element in a network abstraction layer unit header syntax structure; and signaling the network abstraction layer unit header syntax structure having two bytes, wherein a value of the first 1-bit syntax element is equal to zero, a value of the second 1-bit syntax element is equal to zero, and the 6-bit syntax element specifies an identifier of a layer to which a VCL NAL unit belongs or an identifier of a layer to which a non-VCL NAL unit applies.

In one example, a decoding device of decoding network abstraction layer unit information, the decoding device comprising: a processor, and a memory associated with the processor; wherein the processor is configured to perform the following steps: receiving a network abstraction layer unit header syntax structure having two bytes, and decoding a first 1-bit syntax element, a second 1-bit syntax element and a 6-bit syntax element in the network abstraction layer unit header syntax structure, wherein a value of the first 1-bit syntax element is equal to zero, a value of the second 1-bit syntax element is equal to zero, and the 6-bit syntax element specifies an identifier of a layer to which a VCL NAL unit belongs or an identifier of a layer to which a non-VCL NAL unit applies.

DESCRIPTION OF EMBODIMENTS

Figure 1:
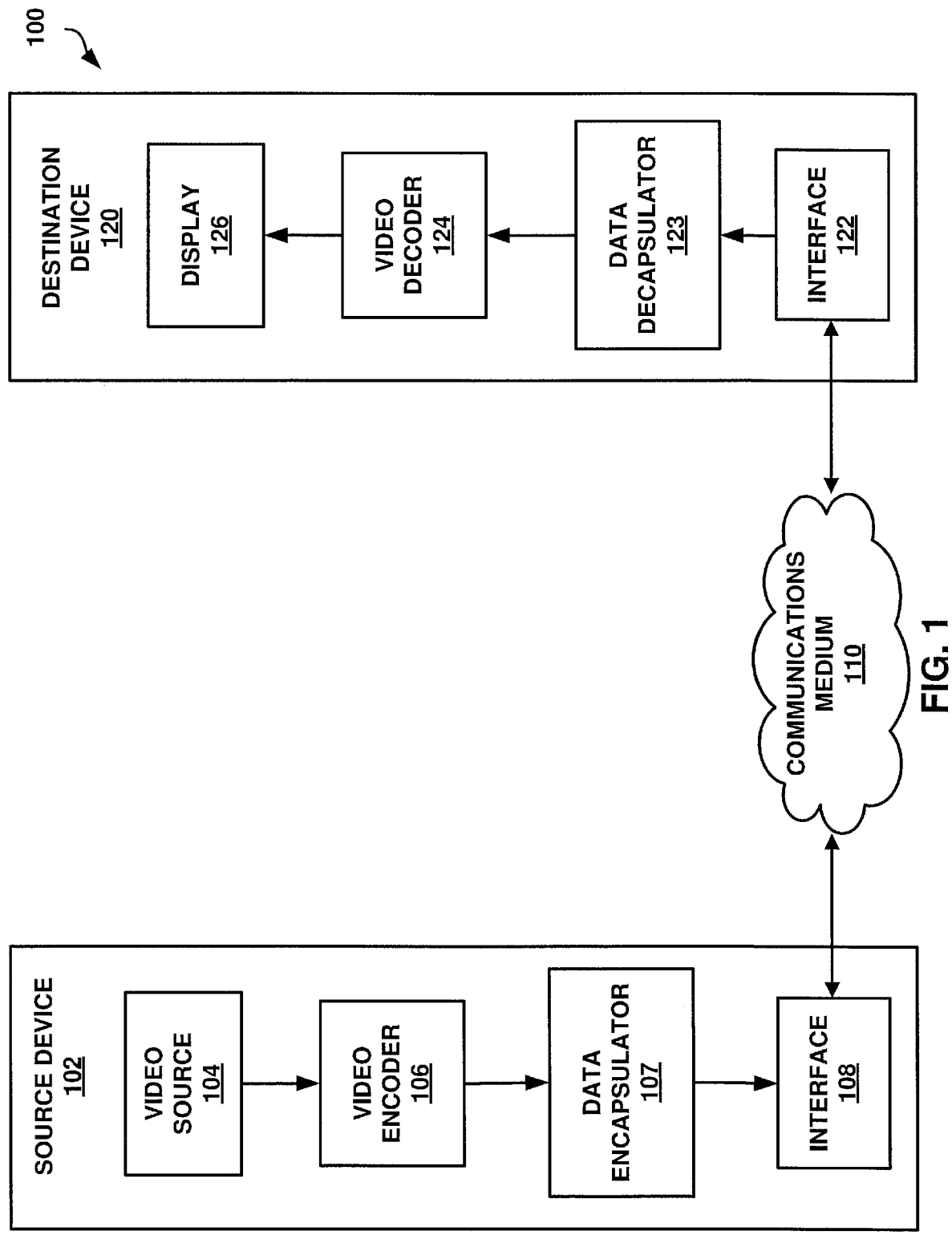
FIG. 1 is a block diagram illustrating an example of a system that may be configured to encode and decode video data according to one or more techniques of this this disclosure.

In general, this disclosure describes various techniques for coding video data. In particular, this disclosure describes techniques for signaling network abstraction layer unit information for coded video data. It should be noted that although techniques of this disclosure are described with respect to ITU-T H.264, ITU-T H.265, JEM, and JVET-N1001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-N1001. Thus, reference to ITU-T H.264, ITU-T H.265, JEM, and/or JVET-N1001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of encoding video data comprises signaling an 8-bit value specifying a layer identifier, wherein the 8-bit value is restricted, signaling a 5-bit value specifying a network abstraction layer unit type, and signaling a 3-bit value specifying a temporal identifier.

In one example, a device comprises one or more processors configured to signal an 8-bit value specifying a layer identifier, wherein the 8-bit value is restricted, signal a 5-bit value specifying a network abstraction layer unit type, and signal a 3-bit value specifying a temporal identifier.

In one example, a non-transitory computer-readable storage medium comprises instructions stored thereon that, when executed, cause one or more processors of a device to signal an 8-bit value specifying a layer identifier, wherein the 8-bit value is restricted, signal a 5-bit value specifying a network abstraction layer unit type, and signal a 3-bit value specifying a temporal identifier.

In one example, an apparatus comprises means for signaling an 8-bit value specifying a layer identifier, wherein the 8-bit value is restricted, means for signaling a 5-bit value specifying a network abstraction layer unit type, and means for signaling a 3-bit value specifying a temporal identifier.

In one example, a method of decoding video data comprises parsing an 8-bit value specifying a layer identifier, wherein the 8-bit value is restricted, parsing a 5-bit value specifying a network abstraction layer unit type, and parsing a 3-bit value specifying a temporal identifier.

In one example, a device comprises one or more processors configured to parse an 8-bit value specifying a layer identifier, wherein the 8-bit value is restricted, parse a 5-bit value specifying a network abstraction layer unit type, and parse a 3-bit value specifying a temporal identifier.

In one example, a non-transitory computer-readable storage medium comprises instructions stored thereon that, when executed, cause one or more processors of a device to parse an 8-bit value specifying a layer identifier, wherein the 8-bit value is restricted, parse a 5-bit value specifying a network abstraction layer unit type, and parse a 3-bit value specifying a temporal identifier.

In one example, an apparatus comprises means for parsing an 8-bit value specifying a layer identifier, wherein the 8-bit value is restricted, means for parsing a 5-bit value specifying a network abstraction layer unit type, and means for parsing a 3-bit value specifying a temporal identifier.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-N1001, CTUs are partitioned according to a quadtree plus multi-type tree (QTMT or QT+MTT) structure. The QTMT in JVET-N1001 is similar to the QTBT in JEM. However, in JVET-N1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

Figure 2:
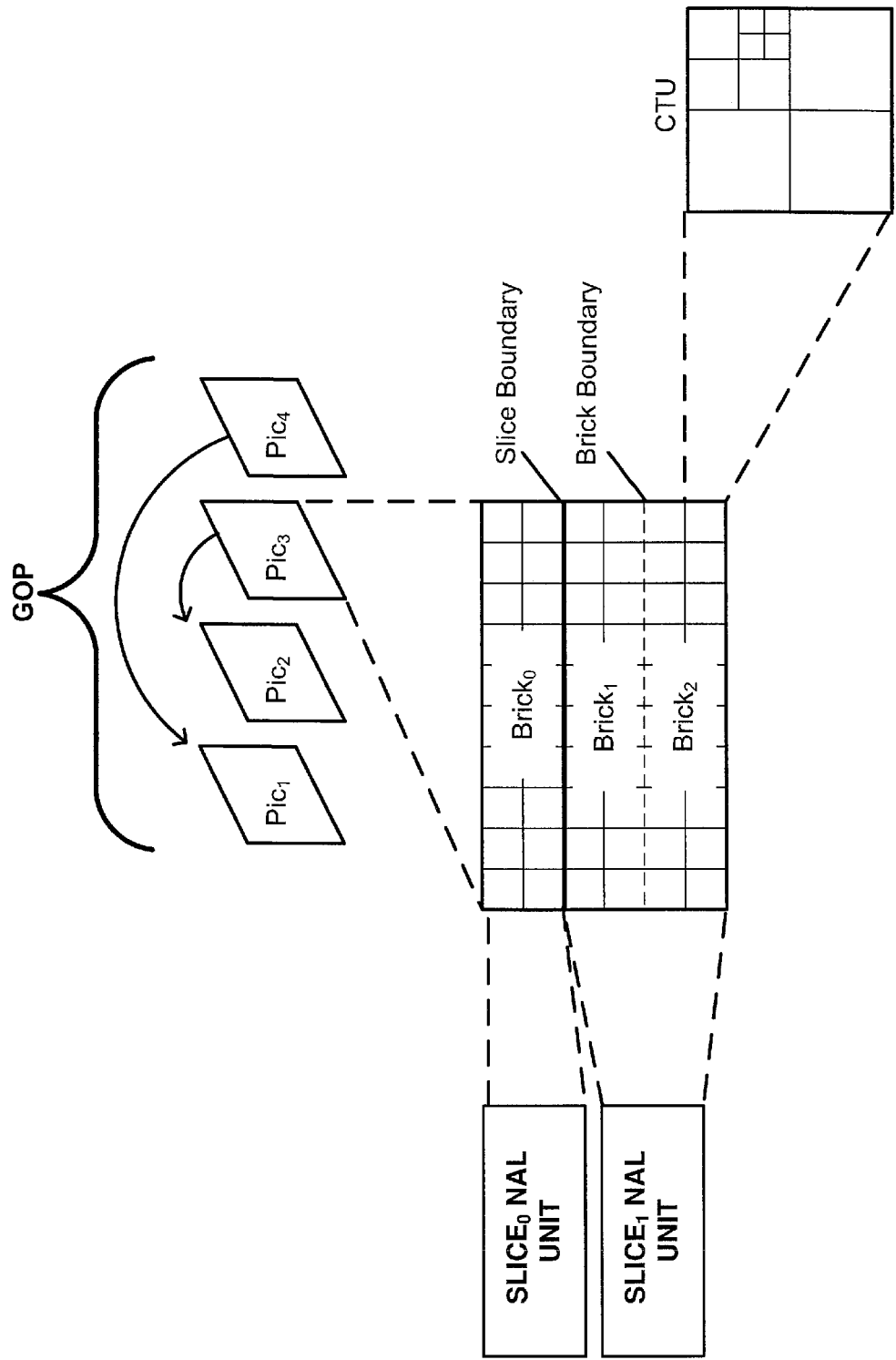
FIG. 2 is a conceptual diagram illustrating coded video data and corresponding data structures according to one or more techniques of this this disclosure.

With respect to JVET-N1001, slices are required to consist of an integer number of bricks instead of only being required to consist of an integer number of CTUs. In JVET-N1001, a brick is a rectangular region of CTU rows within a particular tile in a picture. Further, in JVET-N1001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 2 is a conceptual diagram illustrating an example of a group of pictures including slices. In the example illustrated in FIG. 2, $Pic_3$ is illustrated as including two slices (i.e., $Slice_0$ and $Slice_1$). In the example illustrated in FIG. 2, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_3$ is illustrated as referencing $Pic_2$. Similarly, $Pic_4$ is illustrated as referencing $Pic_1$. With respect to FIG. 2 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-N1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x/y Used to denote division in mathematical equations where no truncation or rounding is intended.

Further, the following mathematical fthictions may be used:
Log2(x) the base-2 logarithm of x;

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.

With respect to the example syntax used herein, the following definitions of logical operators may be applied:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Further, the following relational operators may be applied:
> Greater than
>= Greater than or equal to
< Less than
<= Less than or equal to
=Equal to
!= Not equal to Further, it should he noted that in the syntax descriptors used herein, the following descriptors may be applied:
b(8): byte having any pattern of bit string (8 bits). The parsing process for this descriptor is specified by the return value of the function read_bits(8).
f(n): fixed-pattern bit string using n bits written (from left to right) with the fell bit first. The parsing process for this descriptor is specified by the return value of the function read_bits(n).
se(v): signed integer 0-th order Exp-Golomb-coded syntax element with the left bit first.
tb(v): truncated binary using up to maxVal bits with maxVal defined in the semantics of the symtax element.
tu(v): truncated unary using up to maxVal bits with maxVal defined in the semantics attic syntax element.
u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

As described above, video content includes video sequences comprised of a series of frames (or pictures) and each video frame or picture may be divided into one or more regions. A coded video sequence (CVS) may be encapsulated (or structured) as a sequence of access units, where each access unit includes video data structured as network abstraction layer (NAL) units. A bitstream may be described as including a sequence of NAL units forming one or more CVSs. It should be noted that multi-layer extensions enable a video presentation to include a base layer and one or more additional enhancement layers. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. Each NAL unit may include an identifier indicating a layer of video data the NAL unit is associated with. It should be noted that sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation). Layers may also be coded independent of each other. In this case, there may not be an inter-layer prediction between two layers.

Referring to the example illustrated in FIG. 2, each slice of video data included in $Pic_3$ (i.e., $Slice_0$ and $Slice_1$) is illustrated as being encapsulated in a NAL unit. In JVET-N1001, each of a video sequence, a GOP, a picture, a slice, and CTU may be associated with metadata that describes video coding properties. JVET-N1001 defines parameters sets that may be used to describe video data and/or video coding properties. In particular, JVET-N1001 includes the following five types of parameter sets: decoding parameter set (DPS), video parameter set (VPS), sequence parameter set (SPS), picture parameter set (PPS), and adaption parameter set (APS).

In JVET-N1001, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, JVET-N1001 enables supplemental enhancement information (SEI) messages to be signaled. In JVET-N1001, SEI messages assist in processes related to decoding, display or other purposes, however, SEI messages may not be required for constructing the luma or chroma samples by the decoding process. In JVET-N1001, SEI messages may be signaled in a bitstream using non-VCL NAL units. Further, SEI messages may be conveyed by some means other than by being present in the bitstream (i.e., signaled out-of-band).

An access unit maybe called a layer access unit. As described above, multi-layer extensions enable a video presentation to include a base layer and one or more additional enhancement layers. It should be noted that in ITU-T H.265 a temporal true subset of a scalable layer is not referred to as a layer but referred to as a sub-layer or temporal sub-layer. That is, ITU-T H.265 provides the following definitions with respect to sub-layers:

sub-layer: A temporal scalable layer of a temporal scalable bitstream, consisting of VCL NAL units with a particular value of the TemporalId variable and the associated non-VCL NAL units.

The term sub-layer and temporal sub-layer may be used interchangeably.

Figure 3:
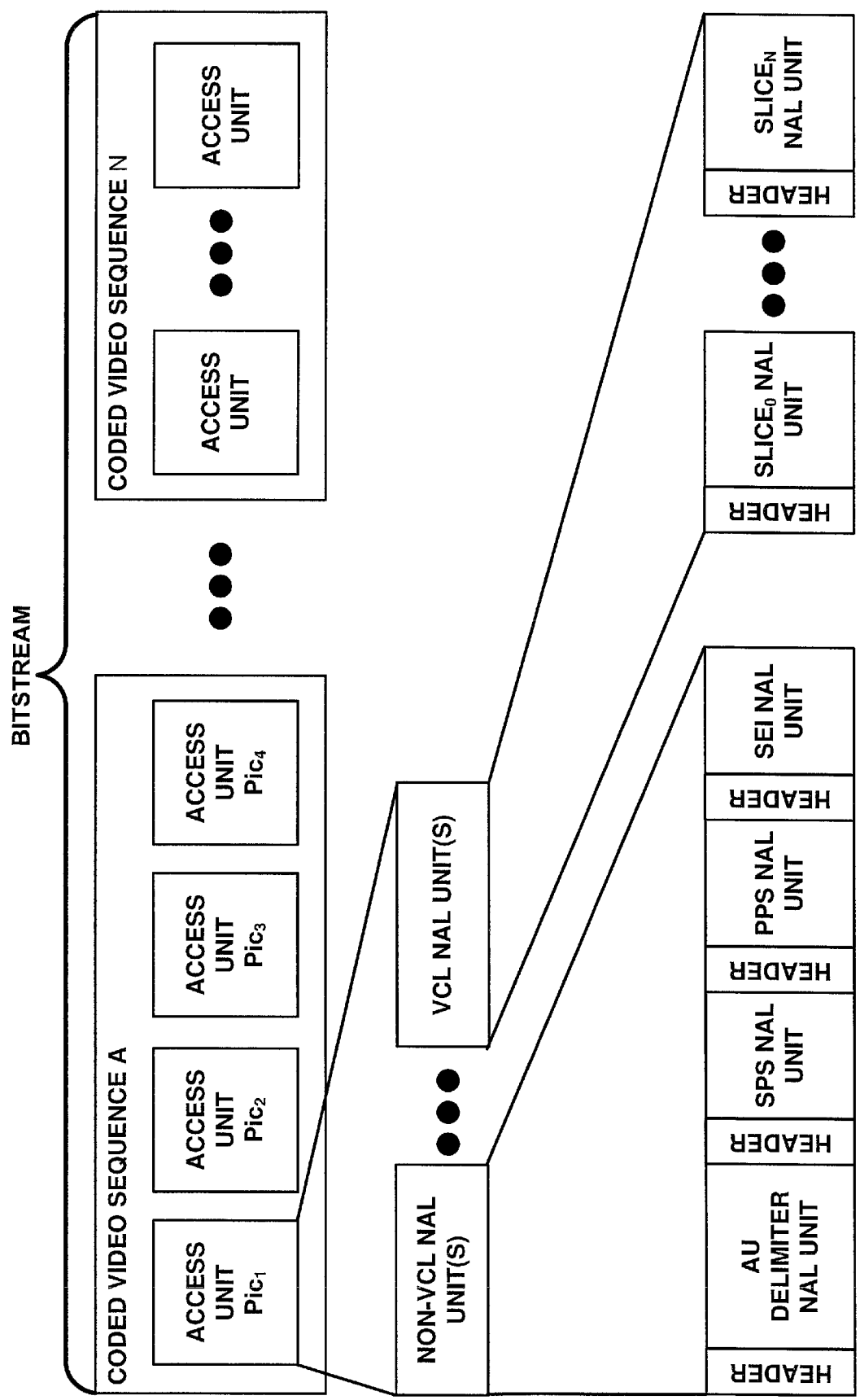
FIG. 3 is a conceptual diagram illustrating a data structure encapsulating coded video data and corresponding metadata according to one or more techniques of this this disclosure.

FIG. 3 illustrates an example of a bitstream including multiple CVSs, where a CVS is represented by NAL units included in a respective access unit. In the example illustrated in FIG. 3, non-VCL NAL units include respective parameter set NAL units (i.e., Sequence Parameter Sets (SPS), and Picture Parameter Set (PPS) NAL units), an SEI message NAL unit, and an access unit delimiter NAL unit. It should be noted that in FIG. 3, HEADER is a NAL unit header.

JVET-N1001 defines NAL unit header semantics that specify the type of Raw Byte Sequence Payload (RBSP) data structure included in the NAL unit. Table 1 illustrates the syntax of the NAL unit header provided in JVET-N1001.

TABLE 1

|  | Descriptor |
|---|---|
| nal_unit_header( ) { |  |
|   zero_tid_required_flag | u(1) |
|   nu_temporal_id_plus1 | u(3) |
|   nal_unit_type_lsb | u(4) |
|   nuh_layer_id | u(7) |
|   nuh_reserved_zero_bit | u(1) |
| } |  |

JVET-N1001 provides the following definitions for the respective syntax elements illustrated in Table 1.

zero_tid_required_flag equal to 0 specifies that zero_tid_required_flag does not impose any additional constraints on the value of nuh_temporal_id_plus1.

nuh_temporal_id_plus1 minus 1 specifies a temporal identifier for the NAL unit.

The value of nuh_temporal_id_plus1 shall not be equal to 0. When zero_tid_required_flag is equal to 1, the value of nuh_temporal_id_plus1 shall be equal to 1.

The variable TemporalId is derived as follows:

TemporalId=nuh_temporal_id_plus1−1

NOTE—NAL unit types in the range of 16 to 31, inclusive, have zero_tid_required_flag equal to 1, and consequently have TemporalId equal to 0.

The value of TemporalId shall be the same for all VCL NAL units of a layer access unit. The value of TemporalId of a coded picture or a layer access unit is the value of the TemporalId of the VCL NAL units of the coded picture or the layer access unit.

The value of TemporalId for non-VCL NAL units is constrained as follows:

If NalUnitType is equal to SPS_NUT, TeniporalId is equal to 0 and the TemporalId of the layer access unit containing the NAL unit shall he equal to 0.

Otherwise, if NalUnitType is equal to APS_NUT, TemporalId shall be equal to that of the layer access unit containing the NAL unit.

Otherwise, when NalUnitType is not equal to EOS_NUT and not equal to EOB_NUT, TemporalId shall be greater than or equal to the TemporalId of the layer access unit containing the NAL unit.

NOTE—When the NAL unit is a non-VCL NAL unit, the value of TemporalId is equal to the minimum value of the TemporalId values of all layer access units to which the non-VCL NAL unit applies. When NalUnitType is equal to PPS_NUT, TemporalId may be greater than or equal to the TemporalId of the containing layer access unit, as all picture parameter sets (PPSs) may be included in the beginning of a bitstream, wherein the first coded picture has TemporalId equal to 0. When NalUnitType is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

nuh_layer_id specifies the identifier of the layer to which a VCL NAL unit belongs or the identifier of a layer to which a non-VCL NAL unit applies. The value of nuh_layer_id shall be in the range of 0 to 126, inclusive. The value of 127 may be specified in the future by ITU-T|ISO/IEC. For purposes other than determining the amount of data in the decoding units of the bitstream, decoders shall ignore all data that follow the value 127 for nuh_layer_id in a NAL unit.

NOTE—The value of 127 for nuh_layer_id may be used to indicate an extended layer identifier in a future extension of this Specification.

The value of nuh_layer_id shall be the same for all VCL NAL units of a coded picture. The value of nuh_layer_id of a coded picture is the value of the nuh_layer_id of the VCL NAL units of the coded picture.

nuh_reserved_zero_bit shall be equal to '0'. The value 1 of nuh_reserved_zero_bit may be specified in the future by ITU-T|ISO/IEC. Decoders shall ignore (i.e. remove from the bitstream and discard) NAL units with nuh_reserved_zero_bit equal to '1'.

It should be noted that syntax element nuh_layer_id results in a bug as the last byte in the NAL unit header can be equal to 0x00, which may lead to a start code emulation, because the NAL unit header is not included in the start code emulation prevention. Thus, it has been proposed to replace syntax element nuh_layer_id with syntax element nuh_layer_id_plus1 to avoid a case where the last byte of the NAL unit header can be equal to 0x00. Proposed syntax element nuh_layer_id_plus1 is described as having the following semantics:

nuh_layer_id_plus1 minus 1 specifies the identifier of the layer to which a VCL NAL unit belongs or the identifier of a layer to which a non-VCL NAL unit applies. The value of nuh_layer_id_plus1 shall be in the range of 1 to 126, inclusive. The value of 127 may be specified in the future by ITU-T|ISO/IEC. For purposes other than determining the amount of data in the decoding units of the bitstream, decoders shall ignore all data that follow the value 127 for nuh_layer_id_plus1 in a NAL unit.

NOTE—The value of 127 for nuh_layer_id_plus1 may be used to indicate an extended layer identifier in a future extension of this Specification.

The variable NuhLayerId is derived as follows:

$$NuhLayerId = nuh\_layer\_id\_plus1 - 1$$

The value of NuhLayerId shall be the same for all VCL NAL units of a coded picture. The value of NuhLayerId of a coded picture is the value of the NuhLayerId of the VCL NAL units of the coded picture.

With respect to the syntax element nal_unit_type_lsb, JVET-N1001 provides the following:

nal_unit_type_lsb specifies the least significant bits for the NAL unit type.

The variable NalUnitType, which specifies the NAL unit type, i.e., the type of RBSP data structure contained in the NAL unit as specified in Table 2 is derived as follows:

$$NalUnitType = (zero\_tid\_required\_flag << 4) + nal\_unit\_type\_lsb$$

NAL units that have NalUnitType in the range of UNSPEC28 . . . UNSPEC31, inclusive, for which semantics are not specified, shall not affect the decoding process specified in this Specification.

NOTE—NAL unit types in the range of UNSPEC28 . . . UNSPEC31 may be used as determined by the application. No decoding process for these values of NalUnitType is specified in this Specification. Since different applications might use these NAL unit types for different purposes, particular care must be exercised in the design of encoders that generate NAL units with these NalUnitType values, and in the design of decoders that interpret the content of NAL units with these NalUnitType values. This Specification does not define any management for these values. These NalUnitType values might only be suitable for use in contexts in which "collisions" of usage (i.e., different definitions of the meaning of the NAL unit content for the same NalUnitType value) are unimportant, or not possible, or are managed—e.g., defined or managed in the controlling application ar transport specification, or by controlling the environment in which bitstreams are distributed.

For purposes other than determining the amount of data in the decoding units of the bitstream, decoders shall ignore (remove from the bitstream and discard) the contents of all NAL units that use reserved values of NalUnitType.

NOTE—This requirement allows future definition of compatible extensions to this Specification.

TABLE 2

| NalUnitType | Name of NalUnitType | Content of NAL unit and RBSP syntax structure | NAL unit type class |
|---|---|---|---|
| 0 | PPS_NUT | Picture parameter set pic_parameter_set_rbsp( ) | non-VCL |
| 1 | AUD_NUT | Access unit delimiter access_unit_delimiter_rbsp( ) | non-VCL |
| 2 | PREFIX_SEI_NUT | Supplemental enhancement information | non-VCL |
| 3 | SUFFIX_SEI_NUT | sei_rbsp( ) | |
| 4 | APS_NUT | Adaptation parameter set adaptation_parameter_set_rbsp( ) | non-VCL |

TABLE 2-continued

| NalUnitType | Name of NalUnitType | Content of NAL unit and RBSP syntax structure | NAL unit type class |
|---|---|---|---|
| 6 5 ... 7 | RSV_NVCL65 ... RSV_NVCL7 | Reserved | non-VCL |
| 8 | TRAIL_NUT | Coded slice of a non-STSA trailing picture slice_layer_rbsp( ) | VCL |
| 9 | STSA_NUT | Coded slice of an STSA picture slice_layer_rbsp( ) | VCL |
| 10 | RADL_NUT | Coded slice of a RADL picture slice_layer_rbsp( ) | VCL |
| 11 | RASL_NUT | Coded slice of a RASL picture slice_layer_rbsp( ) | VCL |
| 12 ... 15 | RSV_VCL_12 ... RSV_VCL_15 | Reserved non-IRAP VCL NAL unit types | VCL |
| 16 | DPS_NUT | Decoding parameter set decoding_parameter_set_rbsp( ) | non-VCL |
| 17 | SPS_NUT | Sequence parameter set seq_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | VPS_NUT | Video parameter set video_parameter_set_rbsp( ) | non-VCL |
| 21 ... 23 | RSV_NVCL21 ... RSV_NVCL23 | Reserved | non-VCL |
| 24 | IDR_W_RADL | Coded slice of an IDR picture slice_layer_rbsp( ) | VCL |
| 25 | IDR_N_LP | | |
| 26 | CRA_NUT | Coded slice of a CRA picture slice_layer_rbsp( ) | VCL |
| 27 | GRA_NUT | Coded slice of a gradual random access picture slice_layer_rbsp( ) | VCL |
| 28 ... 31 | UNSPEC28 ... UNSPEC31 | Unspecified | non-VCL |

NOTE—A clean random access (CRA) picture may have associated RASL or RADL pictures present in the bitstream.

NOTE—An instantaneous decoding refresh (IDR) picture having NalUnitType equal to IDR_N_LP does not have associated leading pictures present in the bitstream. An IDR picture having NalUnitType equal to IDR_W_RADL does not have associated RASL pictures present in the bitstream, but may have associated RADL pictures in the bitstream.

It should be noted that generally, for example with respect to ITU-T H.265, an IRAP a picture is a picture that does not refer to any pictures other than itself for inter prediction in its decoding process. Typically, the first picture in the bitstream in decoding order must be an IRAP picture. In ITU-T H.265, an IRAP picture may be a broken link access (BLA) picture, a clean random access (CRA) picture or an instantaneous decoder refresh (IDR) picture. ITU-T H.265 describes the concept of a leading picture, which is a picture that precedes the associated IRAP picture in output order. ITU-T H.265 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. ITU-T H.265 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. BLA pictures may also be followed by RASL pictures. These RASL pictures are always discarded for BLA pictures and discarded for CRA pictures when they are nondecodable, i.e., when a decoder that starts its decoding process at a CRA point. The other type of picture that can follow an IRAP picture in decoding order and precede it in output order is the random access decodable leading (RADL) picture, which cannot contain references to any pictures that precede the IRAP picture in decoding order.

The NAL unit header design in JVET-N1001 is less than ideal. In particular, the NAL unit header design in JVET-N1001 is limited in that it is only possible to have values in the range of 16-159, inclusive, for the first byte of the NAL unit header, as opposed to, a more complete sub-range of values in the range of 0-255 provided by 8-bits. Thus, the NAL unit header in JVET-N1001 does not fully utilize all possible values that may be signaled using the first byte and inefficiently uses possible codewords. Additionally,in JVET-N1001, the derivation ofNAL unit type (NalUnitType) requires a computation based on two different syntax elements (zero_tid_required_flag and nal_unit_type_lsb), this is relatively complicated and could be an issue for system level and this also makes the specification a bit difficult to understand. This disclosure describes techniques for more efficiently signaling NAL units information in a NAL unit header.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and/or to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
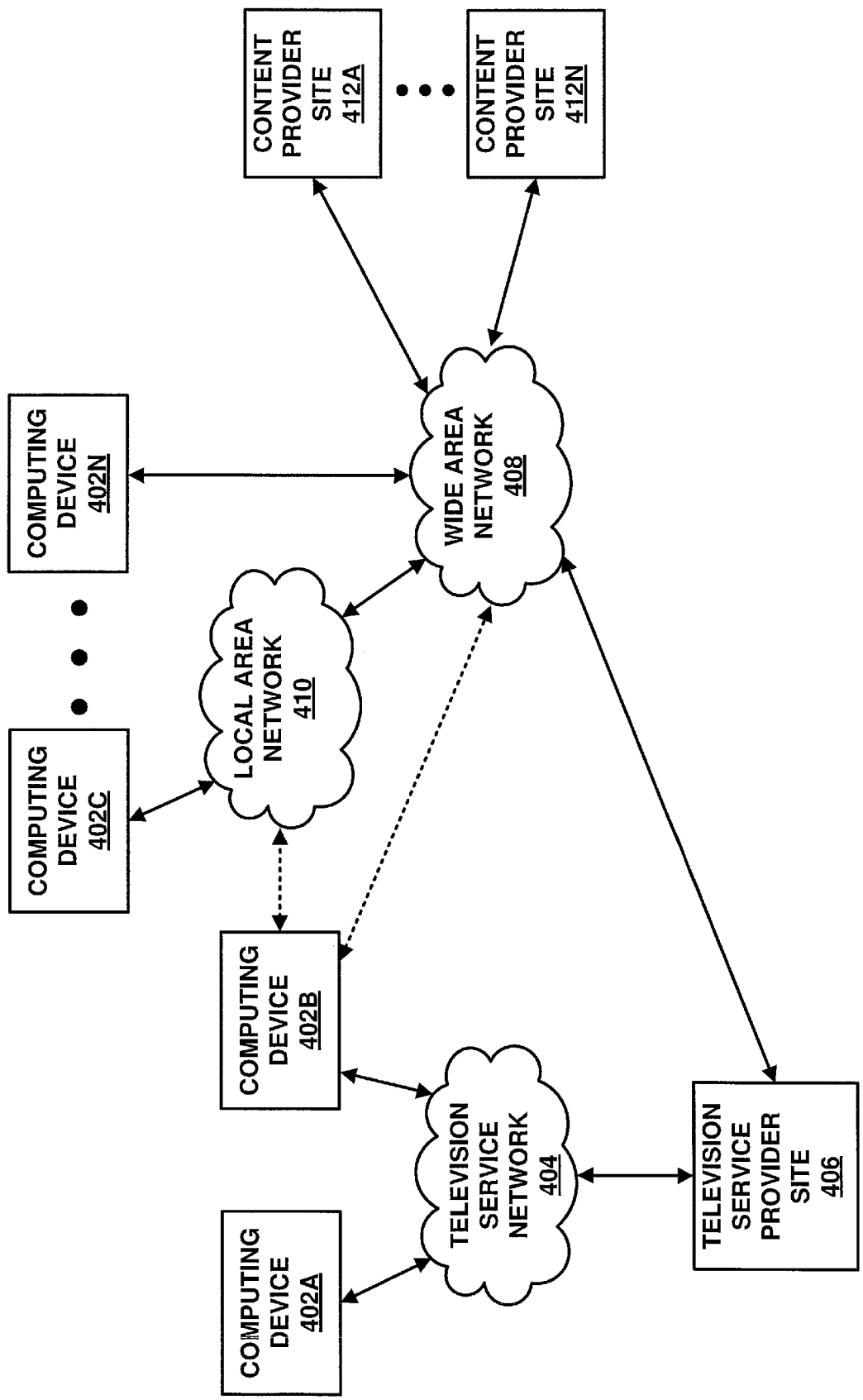
FIG. 4 is a conceptual drawing illustrating an example of components that may be included in an implementation of a system that may be configured to encode and decode video data according to one or more techniques of this this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
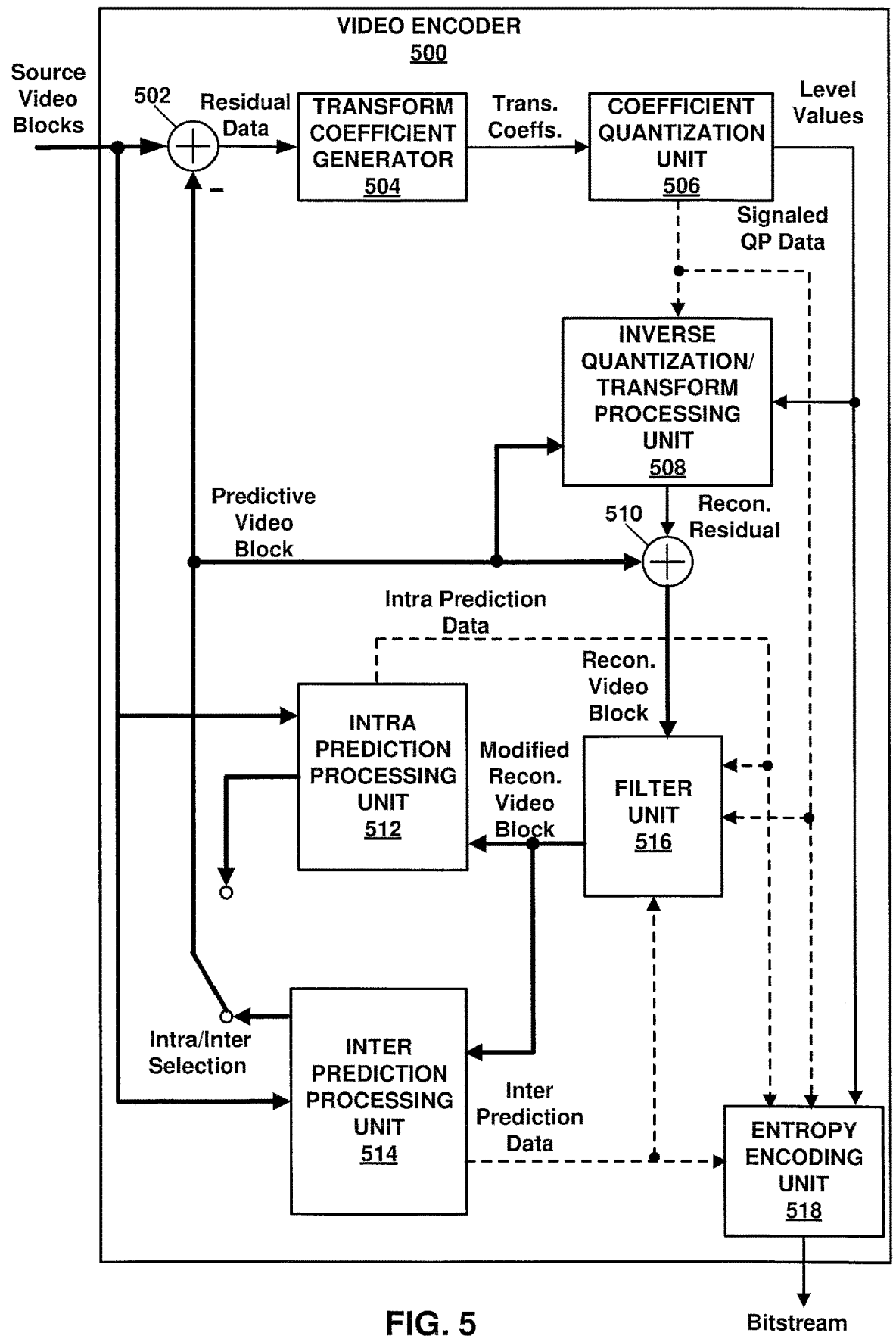
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization.

Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessarily be located in the same physical device as video encoder 106. For example, functions described as being performed by video encoder 106 and data encapsulator 107 may be distributed among devices illustrated in FIG. 4.

As described above, the NAL Unit header design in JVET-N1001 is less than ideal. In one example, according to the techniques herein, syntax element nuh_temporal_id_plus1 in Table 1 may be replaced with a syntax element nuh_temporal_id having semantics based on the following:

nuh_temporal_id specifies a temporal identifier for the NAL unit. When zero_tid_required_flag is equal to 1, the value of nuh_temporal_id shall be equal to 0.

In one example: The value of nuh_temporal_id equal to 7 is kept reserved.

When nal_unit_type is in the range of IDR_W_RADL to RSV_IRAP_VCL13, inclusive, except GRA_NUT the coded tile group belongs to an IRAP picture, TemporalId shall be equal to 0. In another example, When nal_unit_type is in the range of IDR_W_RADL to RSV_IRAP_VCL15, inclusive, except GRA_NUT the coded tile group belongs to an IRAP picture, TemporalId shall be equal to 0.

The variable TemporalId is derived as follows:

TemporalId=nuh_temporal_id

NOTE—NAL unit types in the range of 16 to 31, inclusive, have zero_tid_required_flag equal to 1, and consequently have TemporalId equal to 0.

The value of TemporalId shall be the same for all VCL NAL units of a layer access unit. The value of TemporalId of a coded picture or a layer access unit is the value of the TemporalId of the VCL NAL units of the coded picture or the layer access unit.

The value of TemporalId for non-VCL NAL units is constrained as follows:

If NalUnitType is equal to SPS_NUT, TemporalId is equal to 0 and the Temporaild of the layer access unit containing the NAL unit shall be equal to 0.

Otherwise, if NalUnitType is equal to APS_NUT, TemporalId shall be equal to that of the layer access unit containing the NAL unit.

Otherwise, when NalUnitType is not equal to EOS_NUT and not equal to EOB_NUT, TemporalId shall be greater than or equal to the TemporalId of the layer access unit containing the NAL unit.

NOTE—When the NAL unit is a non-VCL NAL unit, the value of TemporalId is equal to the minimum value of the TemporalId values of all layer access units to which the non-VCL NAL unit applies. When NalUnitType is equal to PPS_NUT, TemporalId may be greater than or equal to the TemporalId of the containing layer access unit, as all picture parameter sets (PPSs) may be included in the beginning of a bitstream, wherein the first coded picture has TemporalId equal to 0. When NalUnitType is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

OR based on the following:

nuh_temporal_id specifies a temporal identifier for the NAL unit.

In one example: The value of nuh_temporal_id equal to 7 is kept reserved.

When nal_unit_type is in the range of IDR_W_RADL to RSV_IRAP_VCL13, inclusive, except GRA_NUT the coded slice belongs to an IRAP picture, TemporalId shall be equal to 0. In another example, When nal_unit_type is in the range of IDR_W_RADL to RSV_IRAP_VCL15, inclusive, except GRA_NUT the coded slice belongs to an IRAP picture, TemporalId shall be equal to 0.

The variable TemporalId is derived as follows:

TemporalId=nuh_temporal_id

The value of TemporalId shall be the same for all VCL NAL units of a layer access unit. The value of TemporalId of a coded picture or a layer access unit is the value of the TemporalId of the VCL NAL units of the coded picture or the layer access unit.

The value of TemporalId for non NCL NAL units is constrained as follows:

If nal_unit_type is equal to SPS_NUT, TemporalId is equal to 0 and the TemporalId of the layer access unit containing the NAL unit shall be equal to 0.

Otherwise, if nal_unit_type is equal to APS_NUT, TemporalId shall be equal to that of the layer access unit containing the NAL unit.

Otherwise, when nal_unit_type is not equal to EOS_NUT and not equal to EOB_NUT, TemporalId shall be greater than or equal to the TemporalId of the layer access unit containing the NAL unit.

NOTE—When the NAL unit is a non-VCL NAL unit, the value of TemporalId is equal to the minimum value of the TemporalId values of all layer access units to which the non-VCL NAL unit applies. When NalUnitType is equal to PPS_NUT, TemporalId may be greater than or equal to the TemporalId of the containing layer access unit, as all picture parameter sets (PPSs) may be included in the beginning of a bitstream, wherein the first coded picture has TemporalId equal to 0. When NalUnitType is equal to PREFIX_SEI_NUT ar SUFFIX_SEI_NUT, TemporaIid may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

It should be noted that replacing syntax element nuh_temporal_id_plus1 in Table 1 with a syntax element nuh_temporal_id allows a value of 0 to be used for this syntax element.

In one example, according to the techniques herein, with respect to Table 1 the position of positions of syntax elements nuh_layer_id (or syntax element nuh_layer_id_plus1 according to the proposed bug fix described above) and nuh_reserved zero_bit may be swapped resulting in the example illustrated in Table 3.

TABLE 3

| | Descriptor |
|---|---|
| nal_unit_header( ) { | |
|   zero_tid_required_flag | u(1) |
|   nuh_temporal_id_plus1 | u(3) |
|   nal_unit_type_lsb | u(4) |
|   nuh_reserved_zero_bit | u(1) |
|   nuh_layer_id | u(7) |
| } | |

With respect to Table 3, the semantics may be based on the semantics provided above with respect to Table 1. It should be noted that since it is anticipated that the nuh_reserved_zero_bit will be used in the future for creating a layer ID value, having this bit as the MSB of the last byte allows for the future use of all 8-bits of the second byte to create the Layer ID value without a bit field swapping.

Further, in one example, according to the techniques herein, the entire last byte of nal_unit_header( ) may be used for a syntax element nuh_layer_id_plus1, resulting in, the example illustrated in Table 4.

TABLE 4

| | Descriptor |
|---|---|
| nal_unit_header( ) { | |
|   zero_tid_required_flag | u(1) |
|   nuh_temporal_id_plus1 | u(3) |
|   nal_unit_type_lsb | u(4) |
|   nuh_layer_id_plus | u(8) |
| } | |

With respect to Table 4, the semantics may be based on the semantics provided above with respect to Table 1 and for syntax element nuh_layer_id_plus1 in one example, the semantics may be based on the following:

nuh_layer_id_plus1 minus 1 specifies the identifier of the layer to which a VCL NAL unit belongs or the identifier of a layer to which a non-VCL NAL unit applies. The value of nuh_layer_id_plus1 shall be in the range of 1 to 126, inclusive. The values in the range of 127 to 255, inclusive may be specified in the future by ITU-T|ISO/IEC. For purposes other than determining the amount of data in the decoding units of the bitstream, decoders shall ignore all data that follow the value 127 to 255, inclusive for nuh_layer_id_plus1 in a NAL unit.

NOTE—The value of 127 for nuh_layer_id may be used to indicate an extended layer identifier in a future extension of this Specification.

The variable NuhLayerID is derived as follows:

NuhLayerId=nuh_layer_id_plus1−1

The value of nuh_layer_id_plus1 shall be the same for all VCL NAL units of a coded picture. The value of nuh_layer_id_plus1 of a coded picture is the value of the nuh_layer_id_plus1 of the VCL NAL units of the coded picture.

With respect to Table 4, it should be noted that the example semantics of nuh_layer_id_plus1 assign the MSB bit to layer ID and keep the remaining bits reserved.

It should be noted that some of the possible code values for the NAL unit in header in JVET-N1001 could still be used while making sure there is no MPEG2 PES start code emulation are currently wasted by strictly requiring TemporalID to be zero for certain nal_unit_types. Thus, according to the techniques herein the syntax element zero_tid_required_flag in Table 1 may be changes to a syntax element constrained_tid_flag to allow for the use of the unused/wasted TemporalID values for certain NAL unit types. Also, in one example, according to the techniques herein, TemporalID values 0, 1, 2 are allowed for NAL unit types RSV_NVCL21, RSV_NVCL22, RSV_NVCL23, UNSPEC28, UNSPEC29, UNSPEC30, UNSPEC31. Further, in one example, the use of TemporalID values other than 0 are allowed for the above mentioned NAL units. Since this allows more freedom for use of those NAL unit types in future. It should be noted that allowing those additional TemporalID values does not result in MPEG2 PES start code emulation. In one example, according to the techniques herein, syntax element zero_tid_required_flag in Table 1 may be replaced with a syntax element constrained_tid_flag resulting in the example illustrated in Table 5.

TABLE 5

|  | Descriptor |
| --- | --- |
| nal_unit_header( ) { |  |
|   constrained_tid_flag | u(1) |
|   nuh_temporal_id_plus1 | u(3) |
|   nal_unit_type_lsb | u(4) |
|   nuh_layer_id | u(7) |
|   nuh_reserved_zero_bit | u(1) |
| } |  |

With respect to Table 5, the semantics may be based on the semantics provided above with respect to Table 1 and for syntax elements constrained_tid_flag, nuh_temporal_id_plus1, and nal_unit_type_lsb in one example, the semantics may be based on the following:

constrained_tid_flag equal to 0 specifies that constrained_tid_flag does not impose any additional constraints on the value of nuh_temporal_id1_plus1.

nuh_temporal_id_plus1 minus 1 specifies a temporal identifier for the NAL unit.

The value of nuh_temporal_id_plus1 shall not be equal to 0. When constrained_tid_flag is equal to 1, the value of nuh_temporal_id_plus1 shall be constrained as follows:

nuh_temporal_id_plus1 shall be equal to 1 for NAL units with NALUnitType DPS_NUT, SPS_NUT, EOS_NUT, EOB_NUT, VPS_NUT, IDR_W_RADL, IDR_N_LP, CRA_NUT, GRA_NUT nuh_temporal_id_plus1 shall be equal to 1 or 2 for NAL units with NALUnitType RSV_NVCL21, RSV_NVCL22, RSV_NVCL23, UNSPEC28, UNSPEC29, UNSPEC30, UNSPEC31

The variable TemporalId is derived as follows:

TemporalId=nuh_temporal_id_plus1−1

NOTE—NAL unit types in the range of 16 to 31, inclusive, have constrained_tid_flag equal to 1, and consequently have TemporalId equal to 0 or 1.

The value of TemporalId shall be the same for all VCL NAL units of a layer access unit.

The value of TemporalId of a coded picture or a layer access unit is the value of the TemporalId of the VCL NAL units of the coded picture or the layer access unit.

The value of TemporalId for non-VCL NAL units is constrained as follows:

If NalUnitType is equal to SPS_NUT, TemporalId is equal to 0 and the TemporalId of the layer access unit containing the NAL unit shall he equal to 0.

Otherwise, if NalUnitType is equal to APS_NUT, TemporalId shall be equal to that of the layer access unit containing the NAL unit.

Otherwise, when NalUnitType is not equal to EOS_NUT and not equal to EOB_NUT, TemporalId shall be greater than or equal to the TemporalId of the layer access unit containing the NAL unit.

NOTE—When the NAL unit is a non-VCL NAL unit, the value of TemporalId is equal to the minimum value of the TemporalId values of all layer access units to which the non-VCL NAL unit applies. When NalUnitType is equal to PPS_NUT, TemporalId may be greater than or equal to the TemporalId of the containing layer access unit, as all picture parameter sets (PPSs) may be included in the beginning of a bitstream, wherein the first coded picture has TemporalId equal to 0. When NalUnitType is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

nal_unit_type_lsb specifies the least significant hits for the NAL unit type.

The variable NalUnitType, which specifies the NAL unit type, i.e., the type of RBSP data structure contained in the NAL unit as specified in Table 2, is derived as follows:

NalUnitType=(constrained_tid_flag<<4)+nal_unit_type_lsb

Further, according to the techniques herein, in one example, the replacement of zero_tid_required_flag in Table 1 with a syntax element constrained_tid_flag may be used in conjunction with the replacement of element nuh_temporal_id_plus1 in Table 1 with a syntax element nuh_temporal_id, resulting in the example illustrated in Table 6.

TABLE 6

|  | Descriptor |
| --- | --- |
| nal_unit_header( ) { |  |
|   constrained_tid_flag | u(1) |
|   nuh_temporal_id | u(3) |
|   nal_unit_type_lsb | u(4) |
|   nuh_layer_id | u(7) |
|   nuh_reserved_zero_bit | u(1) |
| } |  |

With respect to Table 6, the semantics may be based on the semantics provided above with respect to Table 1 and for syntax elements constrained_tid_flag, nuh_temporal_id, and nal_unit_type_lsb in one example, the semantics may be based on the following:

constrained_tid_flag equal to 0 specifies that constrained_tid_flag does not impose any additional constraints on the value of nuh_temporal_id1_plus1.

nuh_temporal_id specifies a temporal identifier for the NAL unit.

The value of nuh_temporal_id shall not be equal to 0. When constrained_tid_flag is equal to 1, the value of nuh_temporal_id shall be constrained as follows:

nuh_temporal_id shall be equal to 0 for NAL units with NALUnitType DPS_NUT, SPS_NUT, EOS_NUT, EOB_NUT, VPS_NUT, IDR_W_RADL, IDR_N_LP, CRA_NUT, GRA_NUT nuh_temporal_id shall be equal to 0 or 1 or 2 for NAL units with NALUnitType RSV_NVCL21, RSV_NVCL22, RSV_NVCL23, UNSPEC28, UNSPEC29, UNSPEC30, UNSPEC31

The variable TemporalId is derived as follows:

TemporalId=nuh_temporal_id

NOTE—NAL unit types in the range of 16 to 31, inclusive, have constrained_tid_flag equal to 1, and consequently have TemporalId equal to 0 or 1 or 2.

The value of TemporalId shall be the same for all VCL NAL units of a layer access unit.

The value of TemporalId of a coded picture or a layer access unit is the value of the TemporalId of the VCL NAL units of the coded picture or the layer access unit.

The value of TemporalId for non-VCL NAL units is constrained as follows:

If NalUnitType is equal to SPS_NUT, TemporalId is equal to 0 and the TemporalId of the layer access unit containing the NAL unit shall be equal to 0.

Otherwise, if NalUnitType is equal to APS_NUT, TemporalId shall be equal to that of the layer access unit containing the NAL unit.

Otherwise, when NalUnitType is not equal to EOS_NUT and not equal to EOB_NUT, TemporalId shall be greater than or equal to the TemporalId of the layer access unit containing the NAL unit.

NOTE—When the NAL unit is a non-VCL NAL unit, the value of TemporalId is equal to the minimum value of the TemporalId values of all layer access units to which the non-VCL NAL unit applies. When NalUnitType is equal to PPS_NUT, TemporalId may be greater than or equal to the TemporalId of the containing layer access unit, as all picture parameter sets (PPSs) may be included in the beginning of a bitstream, wherein the first coded picture has TemporalId equal to 0. When NalUnitType is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

nal_unit_type_lsb specifies the least significant bits for the NAL unit type.

The variable NalUnitType, which specifies the NAL unit type, i.e., the type of RBSP data structure contained in the NAL unit as specified in Table 2, is derived as follows:

NalUnitType=(constrained_tid_flag<<4)+nal_unit_type_lsb

Further, in one example, according to the techniques herein, a nal_unit_header( ) may be based on the example syntax illustrated in Table 7.

TABLE 7

| nal_unit_header( ) { | Descriptor |
|---|---|
| nuh_layer_id | u(8) |
| nal_unit_type | u(5) |
| nuh_temporal_id_plus1 | u(3) |
| } | |

With respect to Table 7, in one example, the semantics may be based on the following:

nuh_layer_id specifies the identifier of the layer to which a VCL NAL unit belongs or the identifier of a layer to which a non-VCL NAL unit applies. The value of nuh_layer_id shall be in the range of 0 to 126, inclusive. The values in the range of 127 to 187, are reserved and may be specified in the future by ITU-T|ISO/IEC. The values in the range of 188 to 255, inclusive are forbidden. (Variant: The value of nuh_layer_id shall not be equal to 188 to 255, inclusive) For purposes other than determining the amount of data in the decoding units of the bitstream, decoders shall ignore all data that hallow the values 127-187, inclusive for nuh_layer_id in a NAL unit.

NOTE—The values of 127-187, inclusive for nuh_layer_id may be used to indicate an extended layer identifier in a future extension of this Specification.

In one example, the values of 127-187 may be used to define spatial scalability and/or SNR scalability and/or view scalability with or without inter-layer prediction.

The value of nuh_layer_id shall be the same for all VCL NAL units of a coded picture. The value of nuh_layer_id of a coded picture is the value of the nuh_layer_id of the VCL NAL units of the coded picture.

nuh_temporal_id_plus1 minus 1 specifies a temporal identifier for the NAL unit.

The value of nuh_temporal_id_plus1 shall not be equal to 0. When nal_unit_type is in the range of IDR_W_RADL to RSV_IRAP_VCL13, inclusive, except GRA_NUT the coded tile group belongs to an IRAP picture, TemporalId shall be equal to 0. In another example, when nal_unit_type is in the range of IDR_W_RADL to RSV_IRAP_VCL15, inclusive, except GRA_NUT the coded tile group belongs to an IRAP picture, TemporalId shall be equal to 0.

The variable TemporalId is derived as follows:

TemporalId=nuh_temporal_id_plus1−1

The value of TemporalId shall be the same for all VCL NAL units of a layer access unit.

The value of TemporalId of a coded picture or a layer access unit is the value of the TemporalId of the VCL NAL units of the coded picture or the layer access unit.

The value of TemporalId for non-VCL NAL units is constrained as follows:

If nal_unit_type is equal to SPS_NUT, TemporalId is equal to 0 and the TemporalId of the layer access unit containing the NAL unit shall be equal to 0.

Otherwise, if nal_unit_type is equal to APS_NUT, TemporalId shall be equal to that of the layer access unit containing the NAL unit.

Otherwise, when nal_unit_type is not equal to EOS_NUT and not equal to EOB_NUT, TemporalId shall be greater than or equal to the TemporalId of the layer access unit containing the NAL unit.

NOTE—When the NAL unit is a non-VCL NAL unit, the value of TemporalId is equal to the minimum value of the TemporalId values of all layer access units to which the non-VCL NAL unit applies. When NalUnitType is equal to PPS_NUT, TemporalId may be greater than or equal to the TemporalId of the containing layer access unit, as all picture parameter sets (PPSs) may be included in the beginning of a bitstream, wherein the first coded picture has TemporalId equal to 0. When NalUnitType is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TetiiporalId of the layer access unit containing the SEI NAL unit.

nal_unit_type specifies the type of RBSP data structure contained in the NAL unit as specified in Table 8.

NAL units that have nal_unit_type in the range of UNSPEC28 ... UNSPEC31, inclusive, for which semantics are not specified, shall not affect the decoding process specified in this Specification.

tion does not define any management for these values. These naLunittype values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream (as specified in Annex C), decoders shall ignore (remove from the bitstream and discard) the contents of all NAL units that use reserved values of nal_unit_type.

NOTE—This requirement allows future definition of compatible extensions to this Specification.

| nal_unit_type | Name of nal_unit_type | Content of NAL unit and RBSP syntax structure | NAL unit type class |
|---|---|---|---|
| 0 | TRAIL_NUT | Coded tile group of a non-STSA trailing picture tile_group_layer_rbsp( ) | VCL |
| 1 | STSA_NUT | Coded tile group of an STSA picture tile_group_layer rbsp( ) | VCL |
| 2 | RASL_NUT | Coded tile group of a RASL picture tile_group_layer_rbsp( ) | VCL |
| 3 | RADL_NUT | Coded tile group of a RADL picture tile_group_layer_rbsp( ) | VCL |
| 4 ... 7 | RSV_VCL_4 ... RSV_VCL_7 | Reserved non-IRAP VCL NAL unit types | VCL |
| 8<br>9 | IDR_W_RADL<br>IDR_N_LP | Coded tile group of an IDR picture tile_group_layer_rbsp( ) | VCL |
| 10 | CRA_NUT | Coded tile group of a CRA picture tile_group_layer_rbsp( ) | VCL |
| 11 | GRA_NUT | Coded slice of a gradual random access picture slice_layer_rbsp( ) | VCL |
| 12<br>13 | RSV_IRAP_VCL12<br>RSV_IRAP_VCL13 | Reserved IRAP VCL NAL unit types | VCL |
| 14 ... 15 | RSV_VCL14 ... RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | BOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 | DPS_NUT | Decoding parameter set decoding_parameter_set_rbsp( ) | non-VCL |
| 25 ... 27 | RSV_NVCL25 ... RSV_NVCL27 | Reserved non-VCL NAL unit types | non-VCL |
| 28 ... 31 | UNSPEC28 ... UNSPEC31 | Unspecified non-VCL NAL unit types | non-VCL |

NOTE—NAL unit types in the range of UNSPEC28 ... UNSPEC31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specifica- NOTE—A clean random access (CRA) picture may have associated RASL or RADL pictures present in the bitstream.

NOTE—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

Further, in one example, nal_unit_type may have the following semantics:

nal_unit_type specifies the type of RBSP data structure contained in the NAL unit as specified in Table 9.

NAL units that have nal_unit_type in the range of UNSPEC28 . . . UNSPEC31, inclusive, for which semantics are not specified, shall not affect the decoding process specified in this Specification.

decoders shall ignore (remove from the hitstream and discard) the contents of all NAL units that use reserved values of nal_unit_type.

NOTE—This requirement allows future definition of compatible extensions to this Specification.

TABLE 9

| nal_unit_type | Name of nal_unit_type | Content of NAL unit and RBSP syntax structure | NAL unit type class |
|---|---|---|---|
| 0 | TRAIL_NUT | Coded tile group of a non-STSA trailing picture tile_group_layer_rbsp( ) | VCL |
| 1 | STSA_NUT | Coded tile group of an STSA picture tile_group_layer_rbsp( ) | VCL |
| 2 | RASL_NUT | Coded tile group of a RASL picture tile_group_layer_rbsp( ) | VCL |
| 3 | RADL_NUT | Coded tile group of a RADL picture tile_group_layer_rbsp( ) | VCL |
| 4 . . . 7 | RSV_VCL_4 . . . RSV_VCL_7 | Reserved non-IRAP VCL NAL unit types | VCL |
| 8 | IDR_W_RADL | Coded tile group of an IDR picture tile_group_layer_rbsp( ) | VCL |
| 9 | IDR_N_LP | | |
| 10 | CRA_NUT | Coded tile group of a CRA picture tile_group_layer_rbsp( ) | VCL |
| 11 | GRA_NUT | Coded slice of a gradual random access picture slice_layer_rbsp( ) | VCL |
| 12 | RSV_IRAP_VCL12 | Reserved IRAP VCL NAL unit types | VCL |
| 13 | RSV_IRAP_VCL13 | | |
| 14 | RSV_IRAP_VCL14 | | |
| 15 | RSV_IRAP_VCL15 | | |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 | DPS_NUT | Decoding parameter set decoding_parameter_set_rbsp( ) | non-VCL |
| 25 . . . 27 | RSV_NVCL25 . . . RSV_NVCL27 | Reserved non-VCL NAL unit types | non-VCL |
| 28 . . . 31 | UNSPEC28 . . . UNSPEC31 | Unspecified non-VCL NAL unit types | non-VCL |

NOTE—NAL unit types in the range of UNSPEC28 . . . UNSPEC31 may be used as determined by the application. No decoding process for these values of nal_unit_type is specified in this Specification. Since different applications might use these NAL unit types for different purposes, particular care must be exercised in the design of encoders that generate NAL, units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream (as specified in Annex C), NOTE—A. clean random access (CRA) picture may have associated RASL or RADL pictures present in the bitstream.

NOTE—An instantaneous decoding refresh (IDR) picture having nal_unit_type equal to IDR_N_LP does not have associated leading pictures present in the bitstream. An IDR picture having nal_unit_type equal to IDR_W_RADL, does not have associated RASL pictures present in the bitstream, but may have associated RADL pictures in the bitstream.

It should be noted that the example NAL unit header in Table 7 provides where for the first byte consisting of syntax element nuh_layer_id, values 188 onwards are forbidden (or are reserved); values 0 to 126, inclusive, are defined to have a meaning as currently provided in JVET-N1001 for independent layers; and additionally values 127 to 187, inclusive, are reserved, possibly to be used for future use with spatial/view/SNR scalability. The second byte of the NAL unit header in Table 7 consists of 5-bit syntax element nal_unit_type, followed by 3-bit syntax element nuh_temporal_id_plus1. Thus, the entire range of values 0-187 in the first byte which is allowed after disallowing MPEG PES start code emulation is used and there is no code space wasted and the nal_unit_type field is contiguous and does not require a derivation based on two syntax elements.

As described above, with respect to Table 7, the values of 127-187, inclusive for nuh_layer_id may be used to indicate an extended layer identifier in a future extension.

Table 10 illustrates an example of how the NAL unit header in Table 7 may be extended in the future for more layers:

TABLE 10

|  | Descriptor |
|---|---|
| nal_unit_header( ) { |  |
|   nuh_layer_id | u(8) |
|   nal_unit_type | u(5) |
|   nuh_temporal_id_plus1 | u(3) |
|   if(nuh_layer_id == 187 { |  |
|     nuh_layer_id_ext | u(x) |
|     nuh_reserved_bit | u(1) |
|   } |  |
| } |  |

It should be noted that the value 187 is used as an example above, but other values may be used instead. Further, it should be noted that the value u(x) above may be some number of bits e.g., u(7), u(15), or some other number.

With respect to Table 10 the semantics may be based on the semantics provided above.

In one example, according to the techniques herein, a nal_unit_header( ) may be based on the example syntax illustrated in Table 11.

TABLE 11

|  | Descriptor |
|---|---|
| nal_unit_header( ) { |  |
|   forbidden_zero_bit | f(1) |
|   nuh_reserved_zero_bit | n(1) |
|   nuh_layer_id | u(6) |
|   nal_unit_type | u(5) |
|   nuh_temporal_id_plus1 | u(3) |
| } |  |

It should be noted that in Table 11, the first bit is assigned as forbidden_zero_bit, followed by a nuh_reserved_zero_bit, followed by 6 bits for nuh_layer_id. With respect to Table 11, in one example, the semantics may be based on the following:

forbidden_zero_bit shall be equal to 0.

nuh_reserved_zero_bit shall be equal to '0'. The value 1 of nuh_reserved_zero_bit may be specified in the future by ITU-T|ISO/IEC. Decoders shall ignore (i.e. remove from the bitstream and discard) NAL units with nuh_reserved_zero_bit equal to '1'.

nuh_layer_id specifies the identifier of the layer to which a VCL NAL unit belongs or the identifier of a layer to which a non-VCL NAL unit applies. The value of nuh_layer_id_plus1 shall be in the range of 0 to 62, inclusive. The value of 63 may be specified in the future by ITU-T|ISO/IEC. For purposes other than determining the amount of data in the decoding units of the bitstream, decoders shall ignore all data that follow the value 63 for nuh_layer_id in a NAL unit.

NOTE—The value of 63 for nuh_layer_id may be used to indicate an extended layer identifier in a future extension of this Specification.

The value of nuh_layer_id shall be the same for all VCL NAL units of a coded picture.

The value of nuh_layer_id of a coded picture is the value of the nuh_layer_id of the VCL NAL units of the coded picture.

nal_unit_type and nuh_temporal_id_plus1 may have the same semantics as provided above.

With respect to Table 11, in one example, the nuh_reserved_zero_bit may be signaled after nuh_layer_id bit as provided in Table 12.

|  | Descriptor |
|---|---|
| nal_unit_header( ) { |  |
|   forbidden_zero_bit | f(1) |
|   nuh_layer_id | u(6) |
|   nuh_reserved_zero_bit | u(1) |
|   nal_unit_type | u(5) |
|   nuh_temporal_id_plus1 | u(3) |
| } |  |

In another example, more values of syntax element nuh_layer_id may he kept reserved as provided in the example semantics of nuh_layer_id below. In the example semantics of nuh_layer_id below, value range 32-63 is kept reserved. It should he noted that in other examples, other values of nuh_layer_id may be in use and values 48-63 may be kept reserved. In general, a value range may be assigned for independent layers, a value range may be assigned for spatial/view scalability layers, and a value range may be kept reserved for future use.

nuh_layer_id specifies the identifier of the layer to which a VCL NAL unit belongs or the identifier of a layer to which a non-VCL NAL unit applies. The value of nuh_layer_id shall be in the range of 0 to 31, inclusive. The values in the range of 32 to 63, are reserved and may be specified in the future by ITU-T|ISO/IEC. For purposes other than determining the amount of data in the decoding units of the bitstream, decoders shall ignore all data that follow the values 32-63, inclusive for nuh_layer_id in a NAL unit.

NOTE—The values of 32-63, inclusive for nuh_layer_id may be used to indicate an extended layer identifier in a future extension of this Specification.

The value of nuh_layer_id shall be the same for all VCL NAL units of a coded picture. The value of nuh_layer_id of a coded picture is the value of the nuh_layer_id of the VCL NAL units of the coded picture.

In this manner, source device 102 represents an example of a device configured to signal an 8-bit value specifying a layer identifier, wherein the 8-bit value is restricted, signal a 5-bit value specifying a network abstraction layer unit type, and signal a 3-bit value specifying a temporal identifier.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
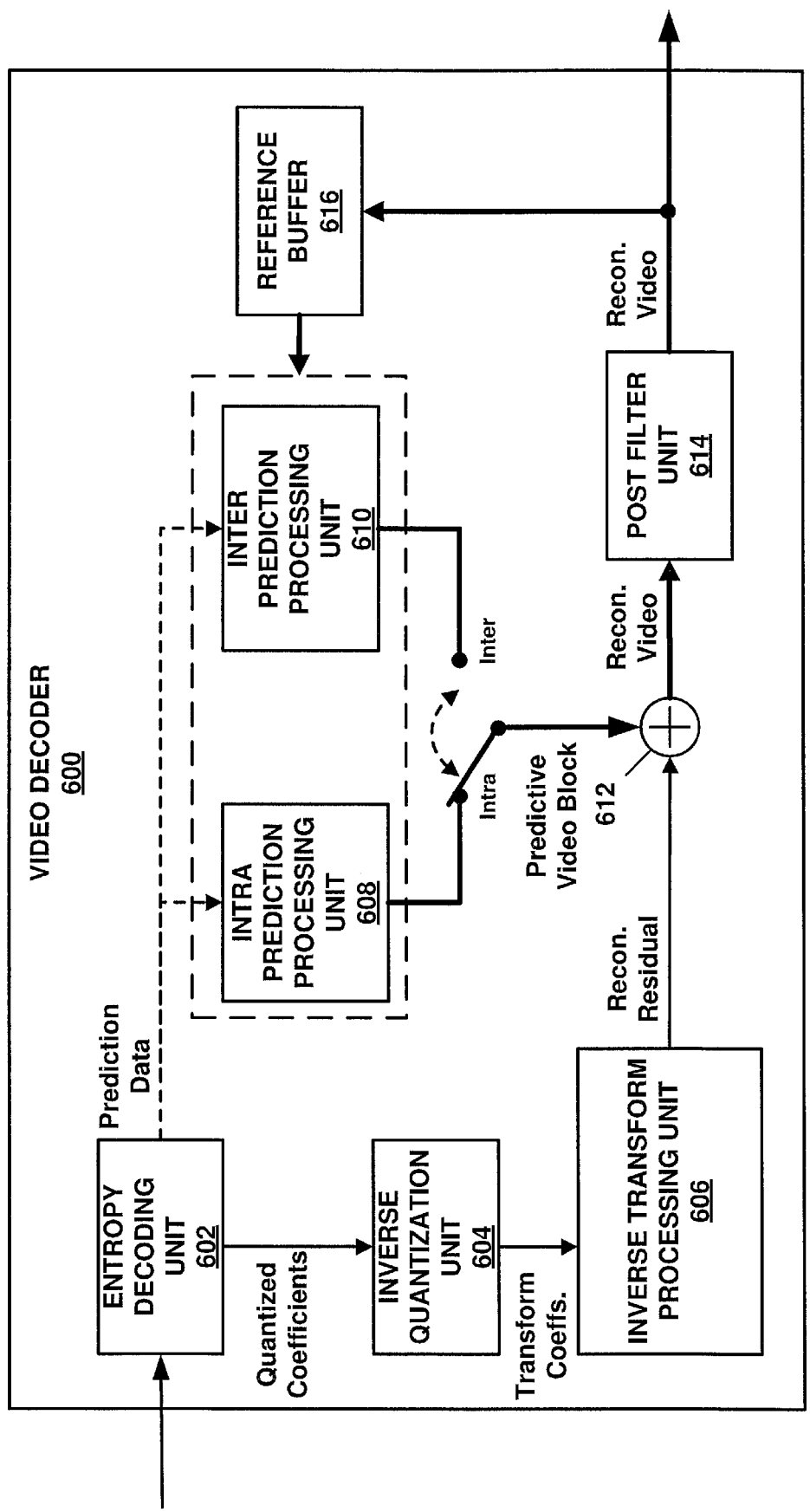
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-9. Video decoder 600 may decode a picture based on or according to the processes described above, and further based on parsed values in Tables 1-9.

In the example illustrated in FIG. 6, video decoder 600 includes an entropy decoding unit 602, inverse quantization unit and transform coefficient processing unit 604, intra prediction processing unit 606, inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and predication data from a bitstream. In the example, illustrated in FIG. 6, inverse quantization unit and transform coefficient processing unit 604 receives a quantization parameter, quantized coefficient values, transform data, and predication data from entropy decoding unit 602 and outputs reconstructed residual data.

Referring again to FIG. 6, reconstructed residual data may be provided to summer 610 Summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 616. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 608 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse an 8-bit value specifying a layer identifier, wherein the 8-bit value is restricted, parse a 5-bit value specifying a network abstraction layer unit type, and parse a 3-bit value specifying a temporal identifier.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY a method of signaling network abstraction layer unit information, the method comprising: signaling an 8-bit value specifying a layer identifier, wherein the 8-bit value is restricted; signaling a 5-bit value specifying a network abstraction layer unit type; and signaling a 3-bit value specifying a temporal identifier.

In one example, a method of decoding network abstraction layer unit information for decoding video data, the method comprising: parsing an 8-bit value specifying a layer identifier, wherein the 8-bit value is restricted; parsing a 5-bit value specifying a network abstraction layer unit type; and parsing a 3-bit value specifying a temporal identifier.

In one example, the method, wherein the 8-bit value is restricted, such that the value shall be in the range of 0 to 126, values in the range of 127 to 187 are reserved, and values in the rand of 188 to 255 are forbidden.

In one example, the method, the 3-bit value specifying a temporal identifier is restricted based on the 5-bit value specifying the network abstraction layer unit type.

In one example, a device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus comprising means for performing any and all combinations of the steps.

In one example, a non-transitory computer-readable storage medium comprising instructions stored thereon that, when executed, cause one or more processors of a device to perform any and all combinations of the steps.

In one example, a method of decoding network abstraction layer unit information, the method comprising: receiving a network abstraction layer unit header syntax structure having two bytes; and decoding a first 1-bit syntax element, a second 1-bit syntax element and a 6-bit syntax element in the network abstraction layer unit header syntax structure, wherein a value of the first 1-bit syntax element is equal to zero, a value of the second 1-bit syntax element is equal to zero, and the 6-bit syntax element specifies an identifier of a layer to which a VCL NAL unit belongs or an identifier of a layer to which a non-VCL NAL unit applies.

In one example, the method, wherein the first 1-bit syntax element is a forbidden zero bit synax element.

In one example, the method, wherein the second 1-bit syntax element is a nuh_reserved_zero_bit syntax element.

In one example, the method, wherein the 6-bit syntax element is a nuh_layer_id syntax element.

In one example, the method, further comprising: ignoring network abstraction layer units with the second 1-bit syntax element is equal to 1.

In one example, method, further comprising: decoding a 5-bit syntax element and a 3-bit syntax element in a network abstraction layer unit header syntax structure, wherein the 5-bit syntax element specifies a NAL unit type, and the 3-bit syntax element specifies a temporal identifier for a NAL unit.

In one example, a method of coding network abstraction layer unit information, the method comprising: coding a first 1-bit syntax element, a second 1-bit syntax element and a 6-bit syntax element in a network abstraction layer unit header syntax structure; and signaling the network abstraction layer unit header syntax structure having two bytes, wherein a value of the first 1-bit syntax element is equal to zero, a value of the second 1-bit syntax element is equal to zero, and the 6-bit syntax element specifies an identifier of a layer to which a VCL NAL unit belongs or an identifier of a layer to which a non-VCL NAL unit applies.

In one example, a decoding device of decoding network abstraction layer unit information, the decoding device comprising: a processor, and a memory associated with the processor; wherein the processor is configured to perform the following steps: receiving a network abstraction layer unit header syntax structure having two bytes, and decoding a first 1-bit syntax element, a second 1-bit syntax element and a 6-bit syntax element in the network abstraction layer unit header syntax structure, wherein a value of the first 1-bit syntax element is equal to zero, a value of the second 1-bit syntax element is equal to zero, and the 6-bit syntax element specifies an identifier of a layer to which a VCL NAL unit belongs or an identifier of a layer to which a non-VCL NAL unit applies.

The invention claimed is:

1. A method of decoding network abstraction layer (NAL) unit information, the method comprising:
   receiving a network abstraction layer unit header syntax structure having two bytes; and
   decoding (i) a nal unit type syntax element and (ii) a nuh temporal id plus one syntax element sequentially in a second byte of the network abstraction layer unit header syntax structure, wherein
   the nal unit type syntax element specifies a NAL unit type, wherein (a) a name of the nal unit type syntax element specified by using a first value represents IDR_W_RADL, (b) a name of the nal unit type syntax element specified by using a second value represents IDR_N_LP, (c) a name of the nal unit type syntax element specified by using a third value represents CRA_NUT, and (d) a name of the nal unit type syntax element specified by using a fourth value represents GRA_NUT,
   the first value, the second value, the third value, and the fourth value are consecutive values,
   the consecutive values immediately follow a fifth value specifying a reserved non-IRAP VCL NAL unit type,
   the consecutive values immediately precede a sixth value specifying a reserved IRAP VCL NAL unit type, and
   the nuh temporal id plus one syntax element minus one specifies a temporal identifier for a NAL unit.

2. A decoding device comprising:
   a processor; and
   a memory associated with the processor, wherein the processor is configured to:
      receive a network abstraction layer unit header syntax structure having two bytes; and
      decode (i) a nal unit type syntax element and (ii) a nuh temporal id plus one syntax element sequentially in a second byte of the network abstraction layer unit header syntax structure, wherein
   the nal unit type syntax element specifies a network abstraction layer (NAL) unit type, wherein (a) a name of the nal unit type syntax element specified by using a first value represents IDR_W_RADL, (b) a name of the nal unit type syntax element specified by using a second value represents IDR_N_LP, (c) a name of the nal unit type syntax element specified by using a third value represents CRA_NUT, and (d) a name of the nal unit type syntax element specified by using a fourth value represents GRA_NUT,
   the first value, the second value, the third value, and the fourth value are consecutive values,
   the consecutive values immediately follow a fifth value specifying a reserved non-IRAP VCL NAL unit type,
   the consecutive values immediately precede a sixth value specifying a reserved IRAP VCL NAL unit type, and
   the nuh temporal id plus one syntax element minus one specifies a temporal identifier for a NAL unit.

3. An encoding device comprising:
   a processor; and
   a memory associated with the processor, wherein the processor is configured to signal a network abstraction layer unit header syntax structure having two bytes, wherein
   the network abstraction layer unit header syntax structure includes (i) a nal unit type syntax element and (ii) a nuh temporal id plus one syntax element sequentially in a second byte of the network abstraction layer unit header syntax structure, wherein
   the nal unit type syntax element specifies a network abstraction layer (NAL) unit type, wherein (a) a name of the nal unit type syntax element specified by using a first value represents IDR_W_RADL, (b) a name of the nal unit type syntax element specified by using a second value represents IDR_N_LP, (c) a name of the nal unit type syntax element specified by using a third value represents CRA_NUT, and (d) a name of the nal unit type syntax element specified by using a fourth value represents GRA_NUT,
   the first value, the second value, the third value, and the fourth value are consecutive values,
   the consecutive values immediately follow a fifth value specifying a reserved non-IRAP VCL NAL unit type,
   the consecutive values immediately precede a sixth value specifying a reserved IRAP VCL NAL unit type, and
   the nuh temporal id plus one syntax element minus one specifies a temporal identifier for a NAL unit.

* * * * *